United States Patent Office 3,265,761
Patented August 9, 1966

3,265,761
POLYURETHANE PREPOLYMER CONTAINING SUBSTITUTED UREA GROUPS AND METHOD OF PREPARATION
Anton J. Havlik, La Crescenta, Calif., and Alan B. Magnusson, Lancaster, Pa., assignors, by mesne assignments, to the United States of America as represented by the Secretary of the Army
No Drawing. Filed Apr. 28, 1964, Ser. No. 363,687
8 Claims. (Cl. 260—858)

This invention relates to prepolymers for use as a binder in castable composite solid propellants and more particularly to polyurethane prepolymers containing substituted urea groups.

Polymeric binders for conventional, castable polyurethane-ammonia perchlorate propellants are usually made from a diol of moderate molecular weight such as polyoxypropylene glycol (2025), a diisocyanate such as 2,4-toluene diisocyanate, and a cross-linking agent such as 1,1,1-trimethylol propane. One procedure by which the ingredients of a formulation are mixed involves the dispersion of finely divided ammonium perchlorate oxidizer containing the required amount of ferric acetylacetonate catalyst into a mixture of the proper quantities of polyoxypropylene glycol, a suitable antioxidant, and 1,1,1-trimethylol propane, and blending for an adequate period in a suitable mixing device. Such devices are well known in the art of solid propellant preparation, as for example the Baker-Perkins sigma blade mixer. The required quantity of 2,4-toluene diisocyanate is added to the mixture and after an adequate mixing period of about one to two total hours, the paste of finely dispersed oxidizer and partially polymerized fuel are poured into a motor case and cured at an elevated temperature. The temperature of cure for polyurethane polymeric binders is usually within the range of 140° F. to 180° F.

The prepolymer used for the propellant binder must produce a composition with certain mechanical and chemical properties. Among some of the more important of the mechanical properties are the elongations at maximum stress and at break; the stress at the maximum of stress-strain curve, the tensile strength; tear strength; and elastic recovery when the stress is removed. Since the polymeric binder and oxidizer are in intimate contact with each other for varying periods of time, and are exposed to moderately high temperature over prolonged storage periods, it is important that the polymeric binder and oxidizer possess good mutual chemical stabilities toward each other. Also for obvious reasons, the polymeric binder should show good chemical stability in aging at elevated temperatures in the presence of either oxygen or ozone.

The use of ferric acetylacetonate as a curing catalyst is well known in the art of polyurethane polymers and propellant compositions. It is also known, but not as generally, that the ferric acetylacetonate assumes roles other than those which are purely catalytic in nature. An undesirable function of the ferric acetylacetonate is the promotion of the degradation of the cured propellant, probably by oxidative degradation of the polymerized fuel-binder. As a consequence of these harmful degradations, the quantity of ferric acetylacetonate used to aid in the cure of the propellant should be held to a minimum, the final amount being a compromise between the quantity necessary to achieve an adequate cure of the polymeric binder and that which can be tolerated without undue degradation processes.

The problem of the catalyst concentration is also related to the quantity of 1,1,1-trimethylol propane used to cross link the prepolymer. The amount of 1,1,1-trimethylol propane used in the formulation of a binder-fuel for a conventional polyurethane-ammonium perchlorate propellant largely determines the mechanical properties of the propellant. Generally, low levels of the cross-linking agent lead to rubbers of better ultimate elongation. At lower levels of the cross-linking agent, however, a higher extent of reaction of the polymerizable fuel must be attained than when high levels of the cross-linking agent are used. The reason for this difference is that a larger extent of reaction is required before an adequate three-dimensional network is formed. To attain the higher extents of reaction in a reasonable period of time, either high cure temperatures or large quantities of catalyst are needed. The use of higher cure temperatures requires necessarily that the temperature of the case-bonded propellant grain be decreased a greater amount than when cured at lower temperatures. This large decrease in temperature is undesirable since it produces greater stresses in the grain and thereby can lead to grain cracking, either during storage or upon ignition. The use of larger quantities of catalyst is also undesirable because of the aforementioned degradation problem. It is evident that a means whereby low levels of both ferric acetylacetonate and the cross-linking agent can be used in the preparation of polyurethane type prepolymers for use in propellant compositions is desirable.

Therefore it is an object of this invention to provide a polyurethane type prepolymer with improved mechanical properties for use in propellant compositions.

Another object of this invention is to provide a method for introducing substituted urea groups into a prepolymer for use in propellant compositions.

A further object of the instant invention is to provide a prepolymer with improved mechanical properties, which has substituted urea groups, and which can be used in the preparation of propellant compositions.

A still further object of this invention is to provide a method of preparing a prepolymer which requires low levels of both curing catalyst and cross-linking agent when it is employed in propellant compositions.

One still further object of this invention is to provide a prepolymer which has good chemical stability with the oxidizer of the propellant composition in which it is employed.

These and other objects will become apparent to one skilled in the art upon reading the detailed description hereinafter.

In general, the objects of this invention are accomplished through the use of prepolymers formed from the reaction of a diisocyanate of the following structure

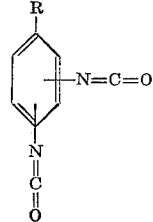

wherein R is a saturated alkyl radical with 1–4 carbon atoms, a glycol selected from the group consisting of polyoxymethylene glycol, polyoxyethylene glycol and polyoxypropylene glycol, and a diamine of the following structure

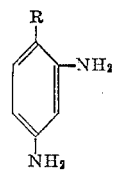

wherein R is a saturated alkyl radical with 1–4 carbon atoms.

First a prepolymer (P–I) is formed from approximately two moles of the diisocyanate and approximately one mole of the glycol. Then, a second prepolymer (P–II) is prepared from approximately two moles of the prepolymer (P–I) and approximately one mole of the diamine.

In the preferred embodiment of this invention, 2,4-toluene diisocyanate, polyoxypropylene glycol, and 2,4-toluene diamine are used in the preparation of the prepolymers P–I and P–II. A prepolymer of P–I is formed from two moles of 2,4-toluene diisocyanate and one mole of polyoxypropylene glycol. This prepolymer is obtained under anhydrous conditions in about 20 hours at room temperature in the presence of 0.03 weight percent ferric acetylacetonate, or in 200 hours at room temperature in the absence of ferric acetylacetonate.

Next, a prepolymer P–II is prepared from two moles of P–I and one mole of 2,4-toluene diamine. While neither the P–I nor P–II is a monodisperse material, they do on the average contain 2 moles of 2,4-toluene diisocyanate and one mole of polyoxypropylene glycol, and 4 moles of 2,4-toluene diisocyanate, 2 moles polyoxypropylene glycol, and 1 mole of 2,4-toluene diamine respectively. Mainly both P–I and P–II are doubly terminated by unreacted isocyanate groups. The preparation of P–II from P–I and 2,4-toluene diamine requires less than 2 hours at ambient temperatures.

The method of preparation described above gives a prepolymer (P–II) with a gel-like character thus restricting its use as a starting material in the preparation of a fuel-binder. However, the incorporation of lithium salts into the reaction mixture of P–I and the diamine prevents the gelation of P–II, thereby enabling the use of P–II as a starting material for the formation of fuel-binders for ammonium perchlorate solid propellants.

The use of lithium salts in the reaction mixture used to prepare P–II can be facilitated by the use of a solvent to dissolve the salt as well as the diamine. Any low boiling solvent which does not interact with isocyanate groups and which is a good solvent for both the lithium salt and the diamine can be used. After the preparation of P–II, the solvent can conveniently and practically completely be removed by flash evaporation techniques familiar to those skilled in the art. The P–II containing dissolved lithium salt is a viscous liquid and can be used as any other diisocyanate in the preparation of binders for solid propellants.

The following procedure illustrates the incorporation of prepolymer P–II into an ammonium perchlorate-polyurethane propellant composition.

*Example*

A solution of 5.60 g. of 2,4-toluene diamine and 7.50 g. of $LiClO_4$ in 54.6 g. of tetrahydrofuran is added to 240.4 g. of P–I (mol. wt. 2600) at ambient temperatures under anhydrous conditions. After a period of 2 hours, 228.4 g. of the P–II solution containing 182.4 g. P–II, 5.55 g. of $LiClO_4$, and 40.4 g. of tetrahydrofuran are mixed with 325 g. of polyoxypropylene glycol (mol. wt. 2060). The mixture is concentrated for about 2.5 hours at temperatures up to 60° C. by rapid distillation on a flash evaporator. The residual mixture contains 325 g. polyoxypropylene glycol, 182.4 g. P–II, 5.55 g. $LiClO_4$, and 0.30 g. tetrahydrofuran. A 474.1 g. portion of the polyoxypropylene glycol: P–II:$LiClO_4$ mixture containing a minor quantity (0.3 g.) of tetrahydrofuran is added to 195.7 g. of polyoxypropylene glycol containing 4.0 g. of 1,1,1-trimethylol propane. This mixture is blended with 864 g. of fine and 2016 g. of coarse ammonium perchlorate, 48.0 g. of 2,4-toluene diamine, 1.0 g. of ferric acetylacetonate, and 9.0 g. of BLE antioxidant. (BLE is the trade name for the commercially available reaction product of diphenylamine and acetone.) The final mixture is cast into a cylindrical charge and cured at 180° F. for 72 hours.

Although specific embodiments have been shown and described, it is to be understood that they are illustrative, and not to be construed as limiting on the scope and spirit of the invention as defined by the appended claims.

We claim:
1. The method of preparation of a polyurethane prepolymer comprising reacting about one mole of 2,4-toluene diamine with about two moles of a previously produced intermediate under anhydrous conditions; said intermediate being the product of reacting about 2 moles of 2,4-toluene diisocyanate with about one mole of polyoxypropylene glycol under anhydrous conditions and in the presence of 0.03 weight percent ferric acetylacetonate, the average molecular weight of said polyoxypropylene glycol being about 2000.

2. The method of claim 1 wherein a lithium salt is incorporated into the reaction of said 2,4-toluene diamine and said previously produced intermediate.

3. The method of claim 2 wherein said lithium salt is lithium perchlorate.

4. The method of claim 2 wherein said lithium salt is introduced into the reaction by using a solvent to dissolve the salt as well as said 2,4-toluene diamine; said solvent being any low boiling solvent which does not interact with isocyanate groups.

5. The method of claim 4 wherein said solvent is tetrahydrofuran.

6. The product of reacting about one mole of 2,4-toluene diamine with about two moles of a previously produced intermediate under anhydrous conditions; said intermediate being the product of reacting about two moles of 2,4-toluene diisocyanate with about one mole of polyoxypropylene glycol under anhydrous conditions and in the presence of 0.03 weight percent ferric acetylacetonate, the average molecular weight of said polyoxypropylene glycol being about 2000.

7. The product according to claim 6 wherein a lithium salt is incorporated into the reaction of said 2,4-toluene diamine and said previously produced intermediate.

8. The product according to claim 7 wherein said lithium salt is lithium perchlorate.

References Cited by the Examiner

UNITED STATES PATENTS 3,132,976 4/1964 Klager et al. _____ 149—19

MURRAY TILLMAN, *Primary Examiner.*

REUBEN EPSTEIN, *Examiner.*

L. A. SEBASTIAN, P. LIEBERMAN,
*Assistant Examiners.*